(12) United States Patent  (10) Patent No.: US 9,235,802 B1
Chamness et al.  (45) Date of Patent: Jan. 12, 2016

(54) AUTOMATED DEFECT AND OPTIMIZATION DISCOVERY

(71) Applicant: EMC Corporation, Hopkinton, MA (US)

(72) Inventors: Mark Chamness, Menlo Park, CA (US); Eric Schnegelberger, Youngsville, NC (US)

(73) Assignee: EMC Corporation, Hopkinton, MA (US)

( * ) Notice: Subject to any disclaimer, the term of this patent is extended or adjusted under 35 U.S.C. 154(b) by 241 days.

(21) Appl. No.: 13/928,810

(22) Filed: Jun. 27, 2013

(51) Int. Cl.
*G06N 5/00* (2006.01)
*G06F 11/00* (2006.01)
*G06N 3/08* (2006.01)

(52) U.S. Cl.
CPC ........................................ *G06N 3/08* (2013.01)

(58) Field of Classification Search
CPC ...................................................... G06N 3/08
See application file for complete search history.

(56) References Cited

U.S. PATENT DOCUMENTS

| | | | |
|---|---|---|---|
| 5,928,369 A | 7/1999 | Keyser et al. | |
| 7,203,864 B2 * | 4/2007 | Goin et al. | 714/26 |
| 7,788,536 B1 | 8/2010 | Qureshi et al. | |
| 7,937,623 B2 | 5/2011 | Ramacher et al. | |
| 2004/0012808 A1 | 1/2004 | Payne et al. | |
| 2005/0114739 A1 * | 5/2005 | Gupta et al. | 714/39 |
| 2005/0120105 A1 * | 6/2005 | Popescu et al. | 709/223 |
| 2005/0278213 A1 | 12/2005 | Faihe | |
| 2007/0220036 A1 | 9/2007 | Das et al. | |
| 2007/0226546 A1 * | 9/2007 | Asthana et al. | 714/47 |
| 2008/0040628 A1 * | 2/2008 | Mandal | 714/4 |
| 2008/0126773 A1 * | 5/2008 | Martinez et al. | 713/1 |
| 2008/0133540 A1 | 6/2008 | Hubbard et al. | |
| 2010/0064285 A1 | 3/2010 | Dechovich et al. | |
| 2010/0077008 A1 | 3/2010 | Davis et al. | |
| 2011/0131453 A1 * | 6/2011 | Fernandess et al. | 714/37 |
| 2012/0041575 A1 * | 2/2012 | Maeda et al. | 700/80 |
| 2012/0078837 A1 | 3/2012 | Bagchi et al. | |
| 2012/0130968 A1 | 5/2012 | Mule | |
| 2012/0226943 A1 * | 9/2012 | Alderman et al. | 714/37 |
| 2012/0303618 A1 | 11/2012 | Dutta et al. | |
| 2013/0007527 A1 | 1/2013 | Petukhov et al. | |
| 2013/0073552 A1 * | 3/2013 | Rangwala et al. | 707/737 |
| 2013/0091266 A1 | 4/2013 | Bhave et al. | |
| 2013/0254599 A1 * | 9/2013 | Katkar et al. | 714/57 |

OTHER PUBLICATIONS

Schnegelberger et al., U.S. Appl. No. 14/038,312, filed Sep. 26, 2013.
Chamness et al., U.S. Appl. No. 13/928,937, filed Jun. 27, 2013.
Chamness et al., U.S. Appl. No. 14/042,491, filed Sep. 30, 2013.
Schnegelberger et al., U.S. Appl. No. 14/042,494, filed Sep. 30, 2013.
Schnegelberger et al., U.S. Appl. No. 14/042,501, filed Sep. 30, 2013.

* cited by examiner

*Primary Examiner* — Alan Chen
(74) *Attorney, Agent, or Firm* — Van Pelt, Yi & James LLP

(57) ABSTRACT

A method, article of manufacture, and apparatus for identifying defects and resolutions is discussed. Computer systems may be grouped into clusters, and their health may be determined based on these groupings. System optimizations or defect solutions may be distributed to systems in unhealthy clusters, bringing them into a healthy cluster.

20 Claims, 4 Drawing Sheets

AUTOMATED DEFECT AND OPTIMIZATION DISCOVERY

CROSS REFERENCE TO RELATED APPLICATIONS

This application is related to co-pending U.S. patent application Ser. No. 13/928,937 (entitled AUTOMATED DEFECT IDENTIFICATION AND RESOLUTION and filed on Jun. 27, 2013), which is incorporated herein by reference for all purposes.

FIELD OF THE INVENTION

This invention relates generally to system defect and optimization discovery, and more particularly to systems and methods for using machine learning algorithms to automatically identify system defect/optimizations.

BACKGROUND OF THE INVENTION

In our data driven world, computer systems are becoming increasingly complex. In an effort to keep mission critical systems online, it is necessary to ensure they are optimally configured and free of defects, such as bugs. This may involve resolving issues as they arise as quickly as possible. To help resolve such issues, computer systems typically record status information in log files. These files may contain information from a single application or a system as a whole.

Log files often record information related to the operation of computer systems and/or individual applications. Often these files are text based and stored on a local computer. When an issue arises, a user may need to review gigabytes of log files containing billions of lines of information. Often the information used to debug a defect is on a single line hidden somewhere in these files.

There is a need, therefore, for an improved method, article of manufacture, and apparatus for automating system defect and optimization discovery, and distributing solutions or optimizations to computer systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
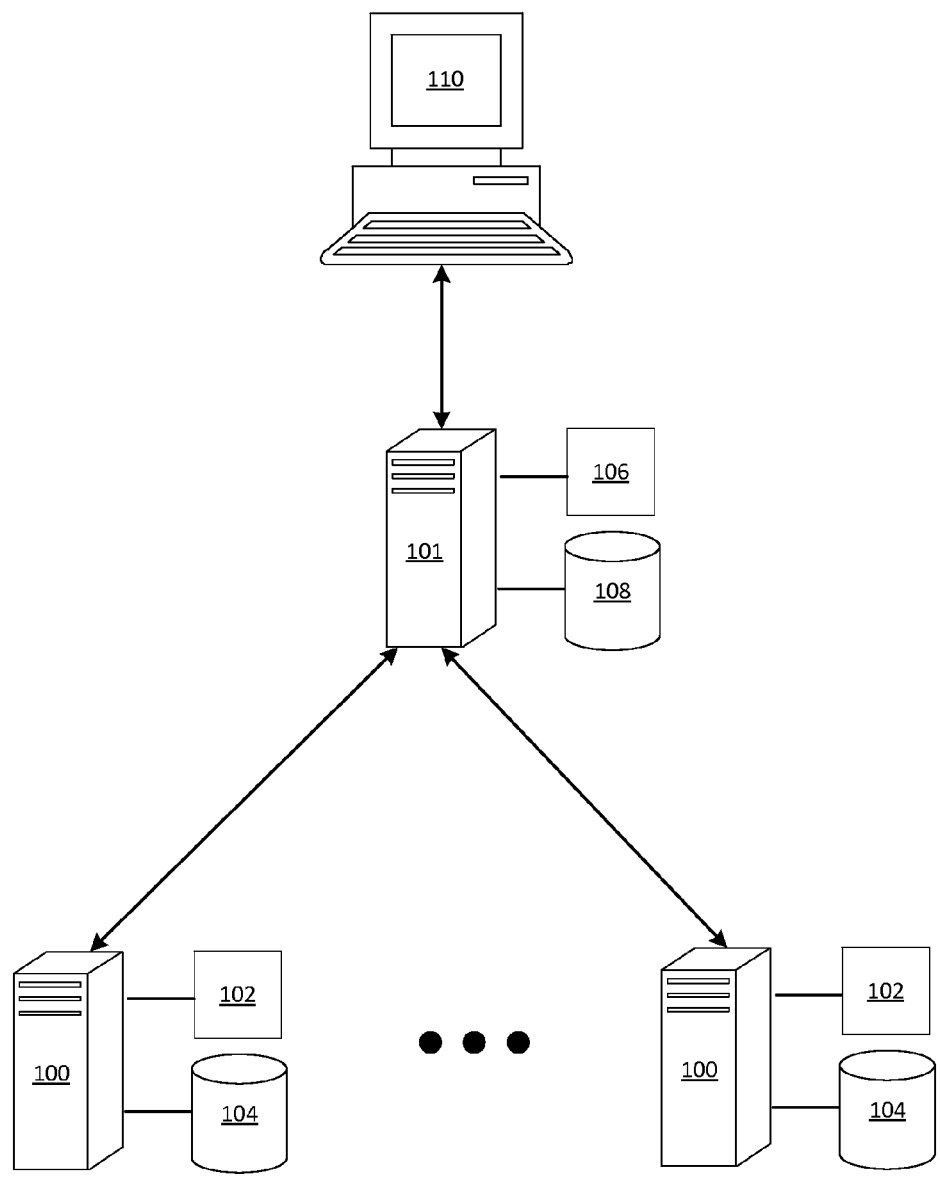
FIG. 1 illustrates system for identifying defect solutions and system optimizations consistent with an embodiment of the present disclosure.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

A system, method, and process are discussed herein for automating system defect and optimization discovery. Computer systems, such as application or web servers, back-up and archiving systems, databases, personal computers and devices, and the like, may monitor and record billions of data points throughout their operation. These data points may include, among others, CPU utilization, drive capacity, available network bandwidth, and/or system downtime. The data points may be recorded in log files and used to identify and/or resolves issues both as they arise and preemptively. Additionally, they may be used to identify unexpected system optimizations.

Identifying systems defects or optimizations from log files may be tedious, times consuming, and expensive. A user may need to comb through gigabytes of files searching for potential issues. These costs compound themselves as systems become increasingly complex. For example, it may take a matter of minutes to identify an issue in a log file for a single application operating on a user's personal computer. It may take hours, days, or even weeks, however, to identify the cause of a crash in a complex data storage system. For mission-critical applications it is essential to minimize the amount of effort needed to identify and resolve system defects, and/or resolve the defects before they occur.

The system herein addresses these needs. In an embodiment, a plurality of computer systems may communicate system data to a central repository. This system data may include all of the data points discussed above, in addition to any other attributes beneficial for monitoring system health and performance. The central repository may include logic, such as a machine-learning algorithm, for analyzing the received data. This logic may identify systems operating in an unhealthy state, and thereafter alert a user or distribute a solution. In some embodiments, additional systems at risk for a similar defect may be identified, and a resolution may be distributed before the defect manifests itself. Additionally or alternatively, the logic may identify systems that are operating unexpectedly well. Those systems may be analyzed to derive a system optimization, and that optimization may be distributed to other systems.

Turning now to FIG. 1, a system for automated system defect and optimization discovery is discussed. A plurality of reporting systems 100 may be in communication with central repository 101. The reporting systems may include processors 102 and non-transitory computer readable mediums 104, and central repository 101 may include processor 106 and non-transitory computer readable medium 108. Reporting systems 100 may report system performance and configuration information back to central repository 101, and central repository 101 may store the information in non-transitory computer readable medium 108. Central repository 101 may thereafter process the data to identify system optimizations and/or system defects. Identified optimizations and/or defect solutions may then be distributed back to reporting systems 100 as necessary or desired. In some embodiments, central repository may be accessed via client 110.

In some embodiments, reporting systems 100 may have a similar function and/or purpose. For example, systems 100 may comprise backup and archive systems, such as a Data Domain® storage system, and each individual system may operate at a different location. One backup system may be installed at a first client site and be utilized only by that client, while a second system operates at a second client site. While FIG. 1 depicts a single server for each reporting system, a reporting system may comprise any number of machines. For example, a given reporting system 100 may comprise multiple nodes in a high-performance computing cluster.

In some embodiments, central repository 101 may comprise a system optimized for storing and processing massive amounts of data in parallel. Central repository 101 may be, for example, a massive parallel-processing ("MPP") database, such as Greenplum Database™). Further, while central repository 101 is only depicted as a single server in FIG. 1, the repository may comprise any number of machines. For example, central repository 101 may comprise a plurality of nodes in a cluster. This may be particularly beneficial when there are a large number of reporting systems 100 transmitting a large amount of data.

Central repository 101 may be controlled by a vendor, developer, or manufacturer of reporting systems 100. These parties may therefore access the central repository, and the data it contains, to derive usage information about their products. This information may be used to derive product insights and improvements, as discussed below.

In some embodiments, once system performance and configuration data is reported to and stored in central repository 101, a machine learning algorithm may process the data to identify optimizations or defects. For example, the k-means algorithm may be applied to the data stored in the repository, and optimizations/defects may be identified through the resulting clusters.

The k-means algorithm is a machine learning algorithm used to group objects into clusters based on a potentially infinite number of input attributes (also referred to as "dimensions" in this document). In the present embodiment, the algorithm may group reporting systems 100 into clusters based on the reported system data. Once these reporting systems are grouped into the clusters, defects and optimizations may be identified. For example, the systems may be clustered based on performance attributes. If systems in a given cluster are performing poorly, the configurations of the systems in the cluster may be analyzed to determine if there is a common cause. If so, an optimized configuration may be distributed to the systems in the cluster to resolve the issue, or the system administrators may be alerted.

In some embodiments, hundreds or thousands of attributes may be used to cluster the reporting systems. These attributes may include performance attributes, such as CPU utilization, memory utilization, system user-load, current system load (i.e. number of jobs), system load over a given time (e.g. last five and/or 15 minutes), system uptime, number of files on the system, individual file size, aggregate files size, file age, system I/O load, system garbage collection, cleaning, and/or data compression. Similarly, the attributes may include configuration attributes, such as network topology, system model (e.g. name, serial number, and/or model number), operating system ("OS"), OS version (major and/or minor), OS build, host, domain, domain topology, system administrator email, firmware identifier(s), firmware version(s), driver identifier(s), driver version(s) and/or system location. If the algorithm processes petabytes or exabytes of data, the computational resources required may be vast. In such an embodiment, a MPP database, as discussed above, may be particularly beneficial.

Figure 2:
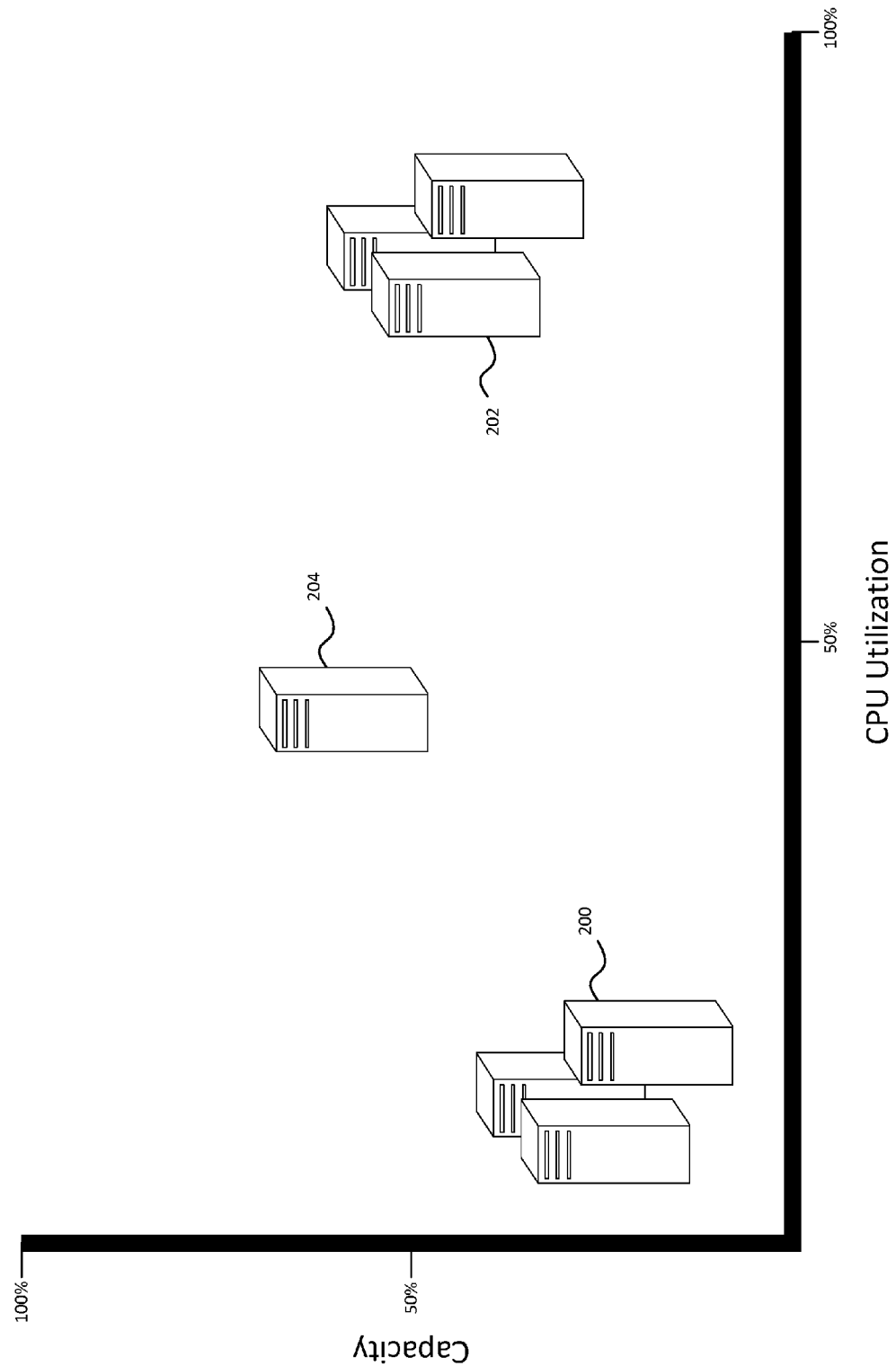
FIG. 2 is a chart depicting how systems may be clustered using a machine learning algorithm consistent with an embodiment of the present disclosure.

FIG. 2 depicts reporting systems, such as reporting systems 100, clustered using a machine learning algorithm, such as the k-means algorithm. For clarity, the systems are only clustered based on two dimensions, Capacity and CPU Utilization. This is for ease of illustration, however, and any number of dimensions is consistent with the present disclosure.

FIG. 2 shows three clusters: cluster 200, cluster 202, and cluster 204. Clusters 200 and 202 each include three systems, and cluster 204 contains a single system. The systems in cluster 200 are operating with less than 50% CPU Utilization and are at less than 50% Capacity. In an embodiment, these systems may be considered to be "healthy" because they have resources available. The reporting systems in cluster 202, in contrast, are operating near 100% CPU Utilization. These systems may be considered "unhealthy" because they may have insufficient resources for processing additional data. Since these systems are clustered together, the central repository may infer that they share a common defect. For example, each of these systems may share a common hardware misconfiguration. Additionally or alternatively, some of the hardware in these systems, such as the CPU's themselves, may be prone to error.

In some embodiments, the systems in cluster 200 may actually be deemed unhealthy. These systems may be viewed as underutilized since they have a large amount of available resources. Cluster 204, in contrast, may be determined to be the healthiest cluster. The system in cluster 204 uses more resources, yet still has a reserve available should they be needed. As such, while clusters and systems are discussed as healthy or unhealthy herein, it should be appreciated that health may vary based on system design and/or administrator defined parameters.

If cluster 202 is identified as an unhealthy cluster, remedial steps may be taken. These steps may include distributing a solution, such as an optimized or best-practice configuration, to the systems in the cluster. The solutions could be distributed automatically via a network connection to systems in a cluster. This distribution may occur without any user intervention. Once the central repository identifies the issue and the solution, the distribution process may be automatic. As a result, optimization/defect identification and resolution may be entirely automated and occur without any user involvement. Additionally or alternatively, the system administrators responsible for the systems in the unhealthy cluster may be notified. Again, this may occur without any user involvement from the party monitoring system health. The repository may email or otherwise notify the reporting system administrator directly, and that administrator may choose to implement the solution or disregard it.

After the reporting systems are grouped into clusters, measuring the distance between the clusters may also expedite defect resolution. For example, the distance of a cluster from the general population (i.e. larger cluster) or from an optimally performance cluster (i.e. healthiest cluster) may be used to prioritize defect investigation and resolution. In FIG. 2, cluster 200 may be the healthiest cluster, cluster 204 is nearest to the healthiest cluster, and cluster 202 is furthest from the healthiest cluster. Identifying and resolving the defects on cluster 202 may therefore take priority over identifying and resolving the defects on cluster 204.

Creating a priority list based on the distance between clusters may also consider additional information. For example, if cluster 204 contained one-hundred systems it may be prioritized over cluster 202, even though it is closer to the healthiest cluster. It may be preferable to solve a problem common to one-hundred systems rather than a problem common to only three system. Other factors impacting the priority list may include performance attributes, configuration attributes, ease of resolution, or the importance of the systems in the cluster.

In some embodiments, machine learning algorithms may be used to identify unexpected optimizations. For example, cluster 204 may be the expected healthiest system. The system in cluster 204 may be configured according to best practices and meet defined benchmarks (e.g. around 50% capacity; 50% CPU Utilization). After clustering the systems, however, it may be apparent that the systems in cluster 200 are actually healthier than the system in cluster 204. This health difference may be particularly surprising if the systems in clusters 200 and 204 are expected to be substantially similar (e.g. same hardware, same applications, etc.). Once the unexpected healthier cluster (cluster 200) is identified, the systems in that cluster may be reviewed to identify the reason for this health. For example, the central repository may examine the configuration data received from the systems 200 and compare it to the configuration data received from system 204. This comparison may identify an optimization, such as an unexpected network configuration, resulting in performance benefits on systems 200. Once the optimization is identified, it may be distributed to other reporting systems, including the system in cluster 204, thereby bringing them into the healthiest cluster.

The k-means algorithm may also be used to identify individual "outlier" systems, such as the system in cluster 204. Once the individual outlier is identified, its performance and configuration attributes may be examined to identify the reason an individual system is performing differently than the rest. Once the issue is identified, a resolution may be distributed to the outlier (assuming it is performing poorly) to bring it into a healthier cluster.

Clustering the systems may also provide insight into how given systems are being used, and how internal processes and development efforts can accommodate this use. For example, quality assurance engineers may expect systems to be configured in a particular manner. Clustering systems based on configuration data, however, may reveal that many end users are configuring their systems in a different manner. QA may therefore alter their internal systems to meet the actual use case, thereby providing a more robust test case for quality assurance.

Similarly, a development team may expect that specific performance attributes are more desirable than others. For example, development teams may place a priority on efficiently using CPU resources. Clustering may reveal, however, that CPU utilization is not an issue on most of the reporting systems, but many of those systems have storage capacity issues. The development team may therefore switch their efforts to address the capacity issues, such as through data deduplication.

Figure 3:
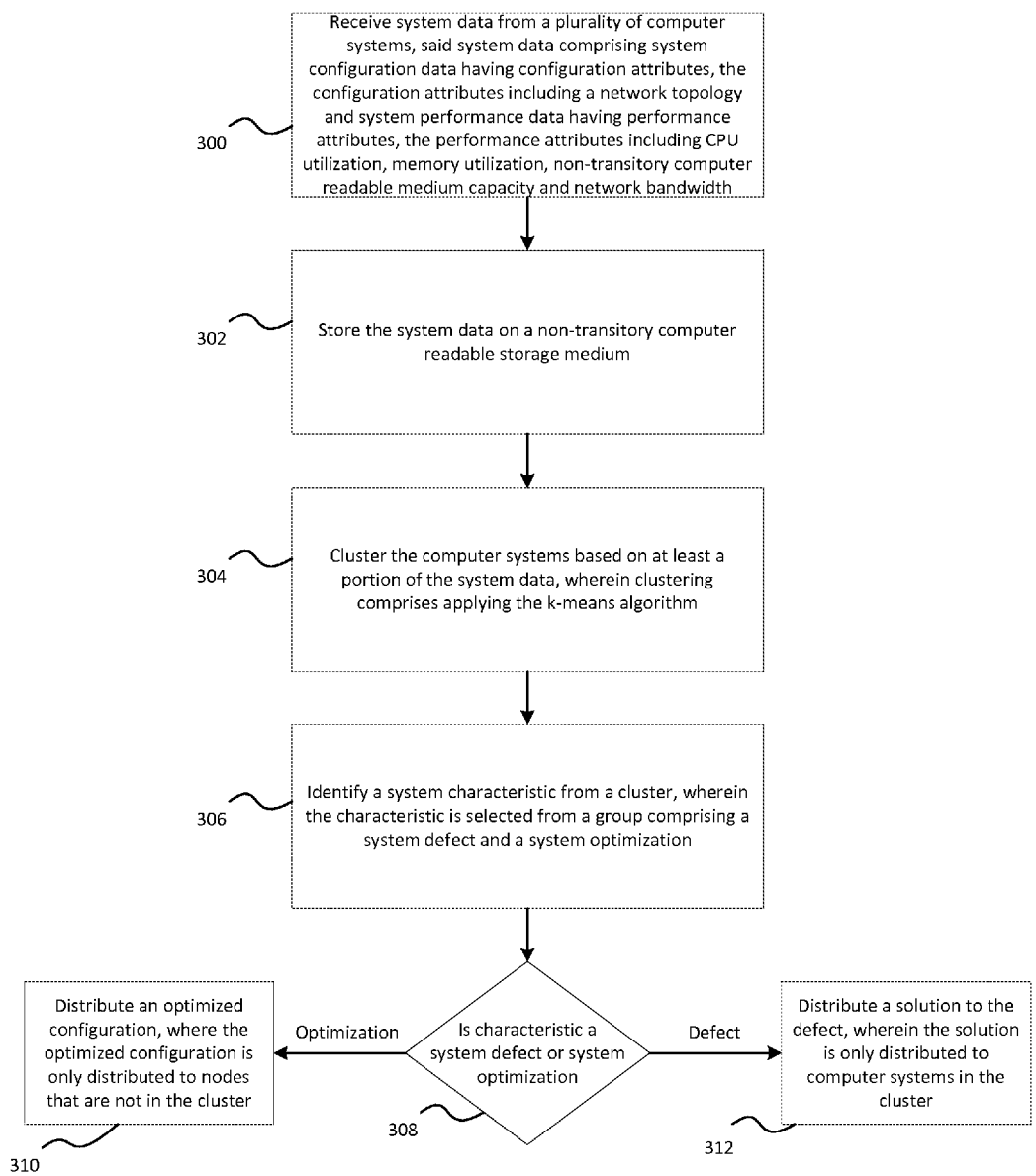
FIG. 3 is a flowchart of a method for identifying and distributing system optimizations and defect solutions consistent with an embodiment of the present disclosure.

Turning now to FIG. 3, a flowchart depicting a process for identifying system defects and optimizations using a machine learning algorithm is discussed. This process could operate, for example, on a system substantially similar to the one shown in FIG. 1.

At 300, system data is received from a plurality of computer systems. These systems could be, for example, reporting systems 100. In an embodiment the system data is received at a central processing system, which may reside at a vendor, developer or OEM sight, such as central repository 101.

In some embodiments, the system data received at 300 may include both configuration data and performance data. Configuration data may include configuration attributes such as network topologies. Performance data may include performance attributes such as CPU utilization, memory utilization, non-transitory computer readable medium capacity, and network bandwidth. In some embodiments, these performance and configuration attributes may be used by a machine learning algorithm to cluster the computer systems, as discussed above.

At 302, the system data may be stored on a non-transitory computer readable storage medium, such as medium 108. In some embodiments, this data is stored in a central repository, such as repository 101, which may comprise multiple physical or virtual nodes. For example, the repository may be a Greenplum Database and the system data may be stored on multiple computer readable medium associated with nodes in the database cluster.

At 304, the computer systems may be clustered on at least a portion of the system data. For example, a machine learning algorithm operating on a central repository may cluster the machines. In some embodiments, this may be a k-means algorithm.

In some embodiments, thousands of performance and configuration attributes may be received at block 300, but they may not all be necessary for clustering at block 304. As a result, the clustering may cover only a portion of the received system data. For example, the computer systems may be clustered based solely on performance attributes to identify performance issues. Further, only a subset of the performance attributes (e.g. only CPU utilization and capacity), may be considered. This may be beneficial if there are a plurality of systems performing poorly, and they all need to be quickly identified. Additionally or alternatively, the computer systems may be clustered solely based on the configuration attributes, or some subset thereof. In an embodiment, the computer systems are cluster both on performance and configuration attributes, or some subset of each.

At 306, a system characteristic may be identified from a given cluster. This characteristic could be, for example, either a system defect or a system optimization. For example, a cluster may include several computer systems performing unexpectedly well. These systems could be clustered based on performance attributes. Once the cluster is identified, the configuration data for all the systems in that cluster may be examined. If an optimized configuration is found, that optimization may be the identified system characteristic. Similarly, if a cluster contains unhealthy systems their configuration may also be examined. If a defect is discovered, that may be the identified system characteristic.

At 308, a check is made to determine whether the identified system characteristic is an optimization or a defect. If the characteristic is an optimization, the process continues to block 310. If the optimization is a defect, the process continues to block 312.

At block 310, an optimized solution is distributed to other computer systems. This distribution may occur from the central repository directly, or system administrators may be notified of the optimization. In some embodiments, the optimization may be a system configuration. For example, an optimized network topology may be identified at block 306, and that topology may be distributed to the other computer systems.

In some embodiments, the optimization may not need to be distributed to every computer system in communication with the repository. For example, all the systems in the cluster from which the optimization was identified may already contain the optimization. The optimization may therefore only be transmitted to systems that are not in the cluster. For example, if the systems in cluster 200 of FIG. 2 have the optimization, the optimization may only be distributed to clusters 202 and 204.

At block 312, a solution to a defect may be distributed to at least some of the computer systems. For example, the system characteristic in 306 may be a defect such as a bug, and a solution may be a patch fixing the bug. In some embodiments, the defect may only be present on nodes in the same cluster. Nodes in healthy clusters may not have the defect and therefore may not need the solution. In such an embodiment, the solution may only be distributed to computer systems in the unhealthy cluster.

Additionally or alternatively, the defect may be present on all the systems, but may only have manifested itself on the systems in the unhealthy cluster. In FIG. 2, for example, cluster 202 may have a defect that is consuming an unexpected amount of CPU. This defect may also exist, however, in the systems of clusters 200 and 204, even though it has not manifested itself. This could occur, for example, when the defect belongs to a particular feature enabled in cluster 202, but not yet enabled in clusters 200 and 204. Once the feature is enabled on a system in those clusters, the defect may manifest and the system may move to cluster 202. In such an embodiment, it may be beneficial to distribute the solution to all the computer systems, even if the defect has not yet manifested on some of them. This may allow for preemptive resolution, thereby preventing the defect from ever becoming an issue.

Figure 4:
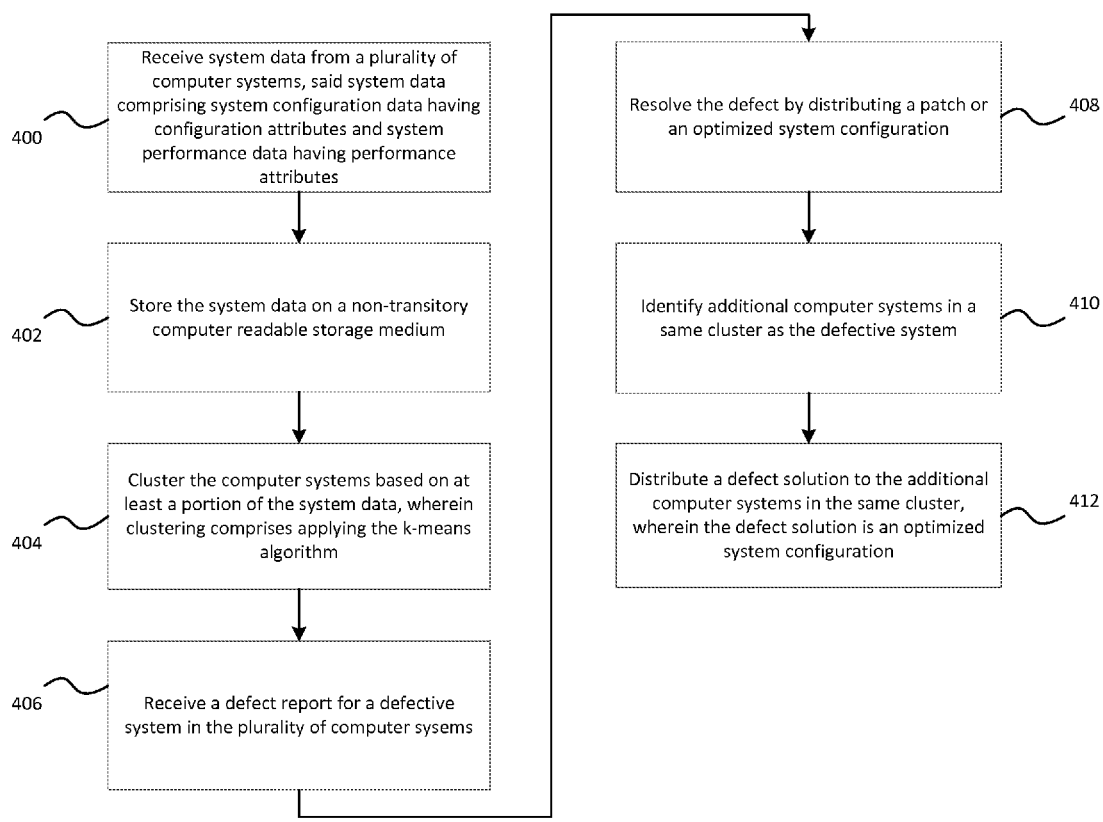
FIG. 4 is a flowchart depicting a method for identifying and resolving defects based on a received defect report.

With reference to FIG. 4, a process is discussed for identifying defects on multiple computer systems based on a defect report for a single system. This may help resolve issues before administrators or users of the computer systems realize the issue actually exists.

At 400, system data may be received from a plurality of computer system. This system data may include system configuration data having configuration attributes, and system performance data having performance attributes. In some embodiments, block 400 may be substantially similar to block 300 discussed above.

At 402, the system data may be stored in a non-transitory computer readable storage medium, and at 404 the computer systems may be clustered based on at least a portion of the system data. In some embodiments, the clustering may be performed by a machine learning algorithm, such as the k-means algorithm. These blocks may be substantially similar to blocks 302 and 304, discussed above.

At 406, a defect report may be received for a defective system in the plurality of systems. For example, if each of these systems operates at a different customer site, one of the customers may identify and report a defect on their system. This defect could be, for example, a bug or a system crash. Additionally or alternatively, a system may be performing poorly and the defect report may merely be a complaint. The report may include a solution to the defect, or may merely indicate an issue exists.

At 408, the reported defect may be resolved on the system. The resolution could be performed, for example, by distributing a patch or an optimized system configuration. In some embodiments, the defect may be identified using the methods discussed above. For example, after the computer systems are clustered, the cluster containing the defective system may be identified. The configuration information for the defective system and/or other systems in the cluster may be compared to the systems in a healthy cluster. If a configuration issue is identified by the comparison, the new configuration information may be distributed to the defective system.

At 410, additional computer systems in the same cluster as the defective system may be identified. Since the defective system is in an unhealthy state, computer systems in the same cluster are likely also unhealthy. Further, given the vast number of attributes which may be used to cluster the computer systems, it is likely that the other computer systems in the unhealthy cluster contain the same defect. The clustering may therefore allow unhealthy systems to be identified before the defect has been reported from those systems.

Once the other systems in the cluster are identified, the defect solution may be distributed to them at 412. In an embodiment, the solution may simply be an optimized system configuration. By distributing the solution to all the computer systems in the cluster, issues may be resolved before they are reported or even before the system administrators/users are aware the issue exists.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A method for identifying defects and optimizations in a computer system, the method comprising:
   receiving system data from a plurality of computer systems, said system data comprising system configuration data having configuration attributes and system performance data having performance attributes;
   storing the system data on a non-transitory computer readable storage medium;
   clustering the computer systems based on at least a portion of the system data;
   using a processor to identify a system characteristic from a cluster, wherein the characteristic is selected from a group comprising a system defect and a system optimization; and
   distributing a solution to a defect when the system characteristic is the system defect, wherein the solution is only distributed to computer systems that are not in the cluster.

2. The method as recited in claim 1, wherein the performance attributes include CPU utilization, memory utilization, non-transitory computer readable medium capacity, and network bandwidth.

3. The method as recited in claim 1, wherein the configuration attributes include network topology data.

4. The method as recited in claim 1, wherein clustering the computer systems comprises applying a k-means algorithm to the system data.

5. The method as recited in claim 1, further comprising distributing an optimized configuration when the system characteristic is the system optimization.

6. The method of claim 5, wherein the optimized configuration is only distributed to computer systems that are not in the cluster.

7. The method as recited in claim 1, wherein distributing includes:
   determining, for each computer system that is not in the cluster, a distance from a healthiest cluster; and
   distributing the solution to the defect in descending distance order, such that the solution to the defect is sent first to the cluster that is furthest from the healthiest cluster.

8. The method as recited in claim 1, wherein distributing includes:
   determining, for each cluster, a number of computer systems in that cluster; and
   distributing the solution to the defect in descending number of computer systems order, such that the solution to the defect is sent first to the cluster having the largest number of computer systems.

9. A system for identifying defects and optimizations in a computer system, the system comprising:
   a repository configured to receive system data from a plurality of computer systems, said system data comprising system configuration data and system performance data, wherein the repository comprises a computer readable storage medium and a processor configured to:
      store the system data on the computer readable storage medium;
      cluster the computer systems based on configuration attributes from the system configuration data and performance attributes from the system performance data;
      identify a system characteristic from a cluster, wherein the characteristic is selected from a group comprising a system defect and a system optimization; and
      distribute a solution to a defect when the system characteristic is the system defect, wherein the solution is only distributed to computer systems that are not in the cluster.

10. The system of claim 9, wherein clustering the computer systems comprises applying a k-means algorithm to the system data.

11. The system of claim 9, the processor further configured to distribute an optimized configuration when the system characteristic is the system optimization.

12. The system of claim 11, wherein the optimized configuration is only distributed to computer systems that are not in the cluster.

13. The system of claim 9, wherein distributing includes:
   determining, for each cluster, a distance from a healthiest cluster; and
   distributing the solution to the defect in descending distance order, such that the solution to the defect is sent first to the cluster that is furthest from the healthiest cluster.

14. The system of claim 9, wherein distributing includes:
   determining, for each cluster, a number of computer systems in that cluster; and
   distributing the solution to the defect in descending number of computer systems order, such that the solution to the defect is sent first to the cluster having the largest number of computer systems.

15. A computer program product for identifying defects and optimizations in a computer system, comprising a non-transitory computer readable storage medium having program instructions embodied therein for:
   receiving system data from a plurality of computer systems, said system data comprising system configuration data and system performance data;
   storing the system data on a non-transitory computer readable storage medium;
   clustering the computer systems based on configuration attributes from the system configuration data and performance attributes from the system performance data;
   identifying a system characteristic from a cluster, wherein the characteristic is selected from a group comprising a system defect and a system optimization; and
   distributing a solution to a defect when the system characteristic is the system defect, wherein the solution is only distributed to computer systems that are not in the cluster.

16. The computer program product of claim 15, wherein clustering the computer systems comprises applying a k-means algorithm to the system data.

17. The computer program product of claim 15, further comprising distributing an optimized configuration when the system characteristic is the system optimization.

18. The computer program product of claim 17, wherein the optimized configuration is only distributed to computer systems that are in the cluster.

19. The computer program product of claim 15, wherein distributing includes:
   determining, for each cluster, a distance from a healthiest cluster; and
   distributing the solution to the defect in descending distance order, such that the solution to the defect is sent first to the cluster that is furthest from the healthiest cluster.

20. The computer program product of claim 15, wherein distributing includes:
- determining, for each cluster, a number of computer systems in that cluster; and
- distributing the solution to the defect in descending number of computer systems order, such that the solution to the defect is sent first to the cluster having the largest number of computer systems.

* * * * *